United States Patent
Li et al.

(10) Patent No.: US 10,914,959 B2
(45) Date of Patent: Feb. 9, 2021

(54) SPATIAL LIGHT STRUCTURING USING A COMBINATION OF MULTIPLE ORTHOGONAL ORBITAL ANGULAR MOMENTUM BEAMS WITH COMPLEX COEFFICIENTS

(71) Applicant: UNIVERSITY OF SOUTHERN CALIFORNIA, Los Angeles, CA (US)

(72) Inventors: Long Li, Los Angeles, CA (US); Cong Liu, Los Angeles, CA (US); Yongxiong Ren, Los Angeles, CA (US); Alan Willner, Los Angeles, CA (US); Guodong Xie, Los Angeles, CA (US); Zhe Zhao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 131 days.

(21) Appl. No.: 15/990,608

(22) Filed: May 26, 2018

(65) Prior Publication Data
US 2018/0341116 A1    Nov. 29, 2018

Related U.S. Application Data

(60) Provisional application No. 62/511,853, filed on May 26, 2017.

(51) Int. Cl.
*G02B 27/09* (2006.01)
*G02B 27/10* (2006.01)
(Continued)

(52) U.S. Cl.
CPC ..... *G02B 27/0927* (2013.01); *G02B 27/0944* (2013.01); *G02B 27/1006* (2013.01);
(Continued)

(58) Field of Classification Search
CPC .............. G02B 27/0927; G02B 27/106; G02B 27/0944; G02B 27/1006; G02B 26/02; G02B 26/06; H04L 5/04
(Continued)

(56) References Cited

U.S. PATENT DOCUMENTS

2015/0349910 A1*  12/2015  Huang ................... H04J 14/00
                                                          398/44

OTHER PUBLICATIONS

Fan, T.Y. et al., "Laser Beam Combining for High-Power, High-Radiance Sources," IEEE Journal of Selected Topics in Quantum Electronics, v. 11, n. 3, May/Jun. 2005, pp. 567-577.
(Continued)

Primary Examiner — Jade R Chwasz
(74) Attorney, Agent, or Firm — Brooks Kushman P.C.

(57) ABSTRACT

A system for structuring a directed energy beam includes one or more coherent light sources that emit one or more initial light beams, one or more spatial light modulators that modulate the one or more initial light beams, and a beam combiner that coherently adds orbital angular momentum beams to create a reconfigurable spatial region of localized power that forms the directed energy beam. Each spatial light modulator is loaded with a pattern that receives an incident light beam and outputs an orbital angular momentum beam. The pattern encodes one or more orthogonal orbital angular momentum functions. Characteristically, each orbital angular momentum having an associated complex weight with which each orbital angular momentum beam is weighted in forming the coherent addition.

14 Claims, 14 Drawing Sheets

(51) Int. Cl.
  *H04L 5/04* (2006.01)
  *G02B 26/02* (2006.01)
  *G02B 26/06* (2006.01)
(52) U.S. Cl.
  CPC .............. *G02B 27/106* (2013.01); *H04L 5/04* (2013.01); *G02B 26/02* (2013.01); *G02B 26/06* (2013.01)
(58) Field of Classification Search
  USPC .......................................................... 359/15
  See application file for complete search history.

(56) References Cited

OTHER PUBLICATIONS

Lü, B. et al., "Coherent and Incoherent Off-Axis Hermite-Gaussian Beam Combinations," Applied Optics, v. 39, n. 8, Mar. 10, 2000, pp. 1279-1289.
Rogel-Salazar, J. et al., "Engineering Structured Light with Optical Vortices," J. Opt. Soc. Am. B / v. 31, n. 6 / Jun. 2014, pp. A46-A50.
Sabourdy, D. et al., "Efficient Coherent Combining of Widely Tunable Fiber Lasers," Optics Express, v. 11, n. 2, Jan. 27, 2003, pp. 87-97.
Xie, G. et al., "Spatial Light Structuring Using a Combination of Multiple Orthogonal Orbital Angular Momentum Beams with Complex Coefficients," Optics Letters, v. 42, Issue 5, pp. 991-994 (2017).
Xie, G. et al., "Spatial Phase and Amplitude Structuring of Beams Using a Combination of Multiple Orthogonal Spatial Functions with Complex Coefficients," arXiv:1605.08842v1 [physics.optics], May 2016, 15 pgs.

* cited by examiner

SPATIAL LIGHT STRUCTURING USING A COMBINATION OF MULTIPLE ORTHOGONAL ORBITAL ANGULAR MOMENTUM BEAMS WITH COMPLEX COEFFICIENTS

CROSS-REFERENCE TO RELATED APPLICATIONS

This application claims the benefit of U.S. provisional application Ser. No. 62/511,853 filed May 26, 2017, the disclosure of which is hereby incorporated in its entirety by reference herein.

TECHNICAL FIELD

In at least one aspect, the present invention relates to methods and systems for structuring a light beam.

BACKGROUND

There has been a fair amount of recent interest in spatially structured beams, in which the phase-front and amplitude are tailored to produce specific shapes [1-4]. These shapes can often be represented by one or multiple terms of a modal basis set, which is a series of mutually orthogonal functions [5, 6]. As one example, Laguerre-Gaussian (LG) modes form an orthogonal set, and each term has an integer number of $2\pi$ c phase changes in the azimuthal direction. For most LG beams, the beam's phase-front twists in a helical fashion as it propagates, such that the beam carries orbital angular momentum (OAM) and has a ring-like intensity profile with a central null [7-9].

SUMMARY

In at least one aspect, uniquely structured orthogonal spatial modes are used to create different beam shapes analogous to time signals that can be composed of multiple frequency functions. The spatial structure of a light beam, and in particular, a coherent light beam is tailored by judiciously choosing a weighted combination of multiple modal states within an orthogonal basis set. In this regard, beam phase and intensity "shapes" can be tunably created that are not otherwise readily achievable. These structured beams provide a new tool to further create phase and intensity profiles that are not readily achievable using conventional approaches. Specifically, one can view a set of orthogonal modes each with its own complex coefficient as a series that can be combined to potentially form any arbitrary shape. This is analogous to the concept of a Fourier series [40-42] (FIG. 3A), in which any time domain signal can be constructed by adding multiple weighted orthogonal sinusoidal waves of integer frequency spacing. In our approach, we utilize a modal basis set, such as OAM, to create unique spatially structured beams by adding multiple orthogonal functions of integer OAM spacing each having a complex weighted coefficient. Such structured beams could be used in many applications for which there is a desire for tunable and unique beam intensity and/or phase shapes (e.g., medical [43], manufacturing [44], and imaging [45]).

In another aspect, a system for structuring a directed energy beam is provided. The system includes one or more coherent light sources that emit one or more initial light beams, one or more spatial light modulators that modulate the one or more initial light beams, and a beam combiner that coherently adds OAM beams to create a reconfigurable spatial region of localized power that forms the directed energy beam. Each spatial light modulator is loaded with a pattern that receives an incident light beam and outputs an orbital angular momentum beam. The pattern encodes one or more orthogonal OAM functions. Characteristically, each OAM beam has an associated complex weight with which each OAM beam is weighted in forming the coherent addition.

BRIEF DESCRIPTION OF THE DRAWINGS

FIG. 1|Principle and Approaches for Beam Structuring. (A) Analogy between the "frequency-time" relationship of a signal and the "OAM spectrum-spatial intensity" relationship of a beam. (B)-(b1) Beam structuring through coherently combining several beams from an orthogonal modal basis with complex coefficients Ci. (b2) Beam structuring through phase and intensity shaping of a single beam.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Abbreviations

"LG" means Laguerre-Gaussian.
"LPDG" means localized power density gain.
"OAM" means orbital angular momentum.

In general, the present invention provides a system that performs a method for structuring a directed energy beam. The method includes steps of generating a plurality of orbital angular momentum beams with one or more coherent light sources and performing a coherent addition of the plurality of the orbital angular momentum beams or a subset thereof with a beam combiner to create a reconfigurable spatial region of localized power that forms the directed energy beam. Characteristically, each of the orbital angular momentum beams has an intensity and phase profile described by one or more orthogonal OAM functions. Moreover, each orbital angular momentum beams has an associated complex weight with which each OAM beam is weighted in forming the coherent additions.

Figure 1:
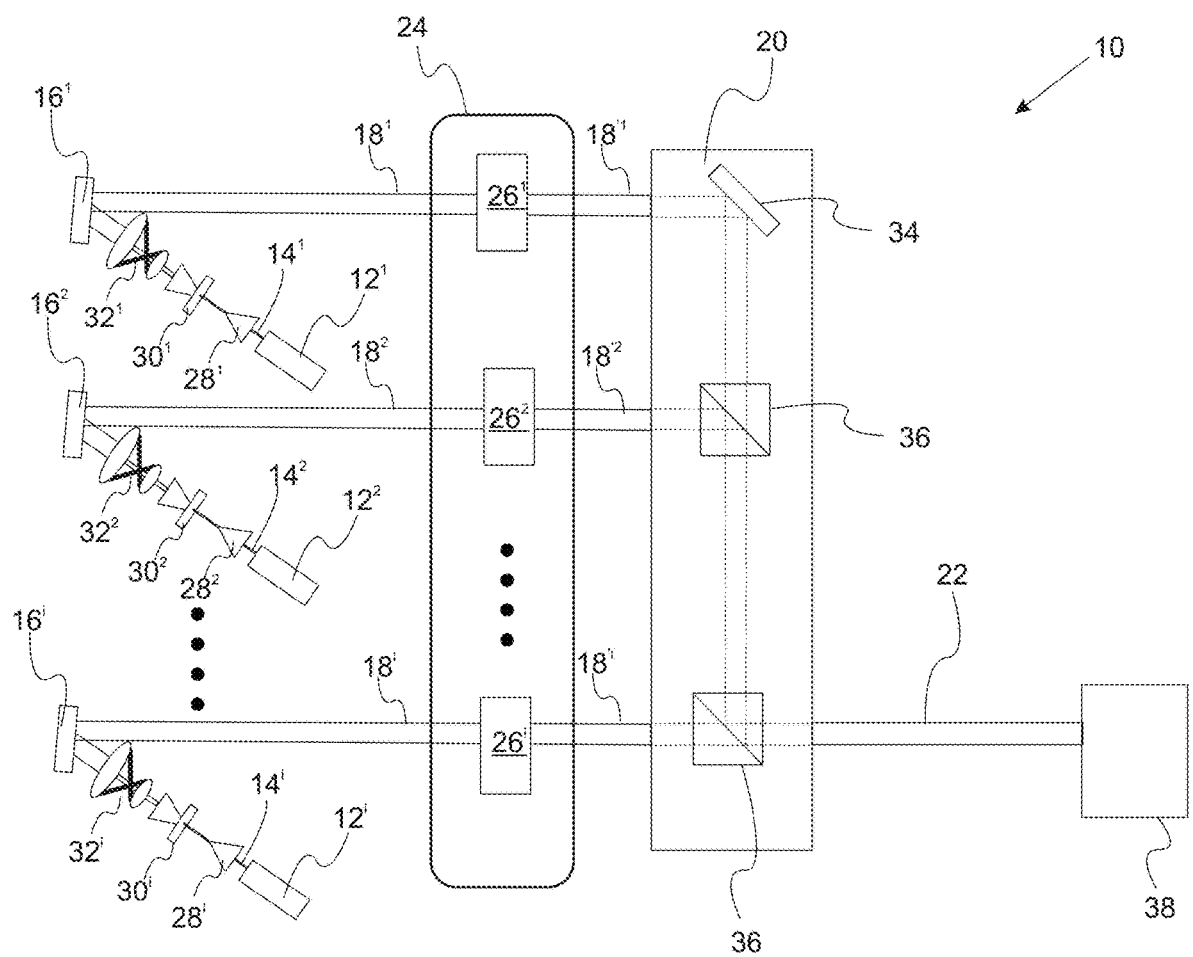
FIG. 1. Schematic of a beam structing system using multiple beams.

With reference to FIG. 1, a schematic illustration of a system for structuring a directed energy beam is provided. System 10 includes one or more coherent light sources $12^i$ (e.g., a laser) that emit one or more initial light beams $14^i$. System 10 also includes one or more spatial light modulators $16^i$ that modulate the one or more initial light beams. Spatial light modulators act as reconfigurable phase gratings, or holograms, giving control over the complex amplitude of the diffracted beams. Spatial light modular can operation by reflection or transmission. In this figure, spatial light modulators operating by transmission are depicted. Each spatial light modulator $16^i$ loaded with a pattern that receives an incident light beam and outputs an orbital angular momentum beam $18^i$. In particular, one or more spatial light modulators $16^i$ are loaded with a pattern that includes a combination of a plurality of orbital angular momentum functions that control the power level and the phase of each beam of the plurality of beams. In a refinement, each of the spatial light modulators $16^i$ are loaded with this pattern. Characteristically, the pattern encodes one or more orthogonal OAM functions. In a refinement, a plurality of orbital angular momentum beams $18^i$ is generated by the one or more coherent light sources emitting a plurality of incident light beams to the one or more spatial light modulators $16^i$. In a further refinement, each of the orbital angular momentum beams $18^i$ are components of an orthogonal basis set.

System 10 also includes beam combiner 18 which performs a coherent addition of the OAM beams to create a reconfigurable spatial region of localized power that forms the directed energy beam 20. Each orbital angular momentum beam $18^i$ has an associated complex weight with which each orbital angular momentum beams $18^i$ is weighted when performing the coherent addition as set forth below in more detail.

In a variation, system 10 can also include optical switch system 24 that can select a subset of the plurality of orbital angular momentum beams $18^{i'}$ from the plurality of orbital angular momentum beams $18^i$ for which the coherent addition is performed. Optical switch system 22 includes a plurality of optical switches $26^i$ associated with one or more of angular momentum beams $18^i$. In a refinement, the selection of the plurality of orbital angular momentum beams can involve tuning or controlling at least one of a beam phase or intensity. System 10 can also include optical amplifiers $28^i$, beam expanders $30^i$ that expand each of the beams, and collimators $32^i$. System 10 can also include optical amplifiers $28^i$ that amplify orbital angular momentum beams $18^i$, beam expanders $30^i$ that expand each of beams (i.e., spatial spread out the beams) that receives and expands the amplified beams, and collimators $32^i$ that collimates each of the expanded beams.

In general, OAM (or LG) beams can be described by their azimuthal (l) and radial (p) indices, which correspond to the number of $2\pi$ phase changes and the number of concentric rings, respectively. In this regard, $L_p^{|l|}$ is the generalized Laguerre polynomial of order p and degree l. OAM beams with l≠0 carry a non-zero OAM, although OAM modes with p=0 have received much recent interest, OAM modes with p≠0 are also of importance. In a refinement, each of the plurality of OAM beams has a different OAM order and has a different complex weight. For example, each beam of the plurality of OAM beams can have no radial change where radial index p is zero.

In a refinement, all beams of the plurality of OAM beams have equal waists. In this refinement, each beam of the plurality can have a size proportional to $l\sqrt{l+1}$ where l is an azimuthal index. In another refinement, all beams of the plurality of OAM beams have equal sizes, but different waists.

In some variations, each beam of the plurality of OAM beams has an azimuthal index (l) from −20 to +20. In other refinements, the absolute value of the azimuthal index is greater than 20. In a refinement, each beam of the plurality of OAM beams has a radial index (p) that is equal to 0. In another refinement, each beam of the plurality of OAM beams has a radial index (p) that is not equal to 0. In other variations, the plurality of OAM beams includes 2l OAM beams having orders−l to +l wherein l is an integer representing an azimuthal index.

As set forth above, system 10 includes one or more spatial modulators $16^i$. The one or more spatial light modulators $16^i$ can control power level and phase of each beam of the plurality of beams. The one or more spatial light modulators $16^i$ can control power level and phase of each beam of the plurality of beams based on an orbital angular momentum (OAM) superposition. In one variation, one or more spatial light modulators $16^i$ can control power level and phase to be equal to the power level and the phase of the other beams of the plurality of beams.

Also depicted in FIG. 1, optical receiving device 38 receives such structured beams 22. Optical receiving device 38 can be part of any system that requires tunable and unique beam intensity and/or phase shapes (e.g., medical [43], manufacturing [44], and imaging [45]).

In another variation, one or more coherent light sources $16^i$ includes a laser configured to generate a single beam, the one or more spatial light modulators configured to divide the single beam into a plurality of beams; control a power level of each beam of the plurality of beams; and control a phase of each beam of the plurality of beams.

As set forth above, system 10 also includes beam combiner 18 which performs a coherent addition of the OAM beams to create directed energy beam 20. The present embodiment is not limited by the particular type of beam combiner that is used. In one variation, beam combiner 18 can include mirror(s) 34 and beam splitter(s) 36 to accomplish the combinations. Phase shifter, filters, and other optical components can be used to adjust the weights if necessary. The following formula describes this addition as follows:

$$F(r;\theta;0) = \Sigma_{i=1}^n \alpha_i \exp(j\varphi^i) f_i(r;\theta;0) \quad (1)$$

where $F(r; \theta; 0)$ is the resultant directed energy beam 20; $f_i(r; \theta; 0)$ is the complex field of the i-th contributing beam; i is an integer (i=1; 2; ...; n) representing each beam; $(r; \theta; z)$ are the cylindrical coordinates; and $\alpha_i$ and $\varphi_i$ are the amplitude and temporal phase weights, respectively. The electrical field after a z-distance propagation, $F(r; \theta; z)$, could be derived from $F(r; \theta; 0)$, according to the Kirchhoff-Fresnel diffraction [23]. In at least one variation, an orthogonal basis $f_i(r; \theta; 0)$ is chosen and its complex coefficient $C_i = \alpha_i \exp(j\varphi_i)$ manipulated such that $F(r; \theta; z)$ has the desired spatial phase and intensity distribution. For example, to achieve a higher localized intensity, the peak of $F(r; \theta; z) \cdot F^*(r; \theta; z)$ should be maximized.

Each component beam can be represented at z=0 by:

$$f_i(r;\theta,0) = \sqrt{I(r,\theta,)}\exp(j\psi(r,\Theta)) \quad (2)$$

where $I(r; \theta)$ and $\psi(r; \theta)$ are the basis's spatial intensity and phase distribution, respectively.

To create a desired spatial phase and intensity, multiple OAM beams with p=0 are combined, which has an $\exp(j\ell\theta)$ helical transverse [7]. Therefore, $$\begin{cases} I(r, \theta) \propto r^{|\ell|}\exp(-r^2) \\ \Psi(r, \theta) = \ell\theta \end{cases} \quad (3)$$

Figure 2:
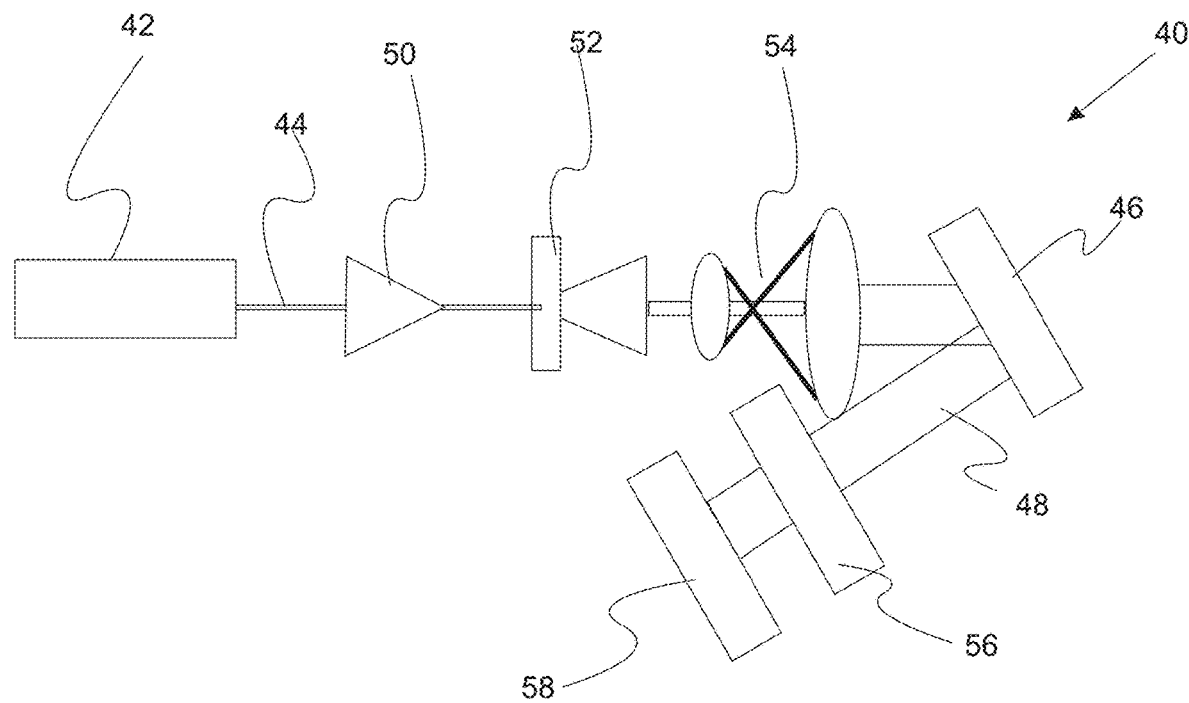
FIG. 2. Schematic of a beam structing system using a single beam.

With reference to FIG. 2, a system for structuring a directed energy beam is provided. System 40 includes a coherent light source (e.g., a laser) configured to generate a single beam 42 and spatial light modulator 46 that receives the single beam 42. Spatial light modulator 44 includes a hologram loaded thereon that controls both intensity and phase of an outgoing structured beam 48. In a variation, the hologram is described by the following equation:

$$\Phi(x,y)_{holo} = (((\Phi(x,y)_{phase} + \Phi(x)_{grating}) - \pi)\operatorname{sinc}^2(1-I(x,y))) + \pi$$

where $\Phi(x,y)_{holo}$ is the hologram loaded on the spatial light modulator (SLM); $\Phi(x,y)_{phase}$ is a designed phase mask; $\Phi(x)_{grating}$ is blazed diffraction grating in x direction; and $I(x,y)$ is a designed normalized intensity mask. System 40 can also include optical amplifier 50 that amplifies beam 42, beam expander 52 that receives and expands the amplified beam, and a collimator 54 that collimates the expanded beam. In a variation, system 40 includes intensity mask 56 to reduce the intensity and phase of an outgoing structured beam 48 as needed. Intensity mask 56 can be a filter (e.g., a neutral density filter or a SLM). In a refinement, optical receiving device 58 receives structured beam 48. Optical receiving device 58 can be part of any system that requires tunable and unique beam intensity and/or phase shapes (e.g., medical [43], manufacturing [44], and imaging [45]).

Figure 3A:
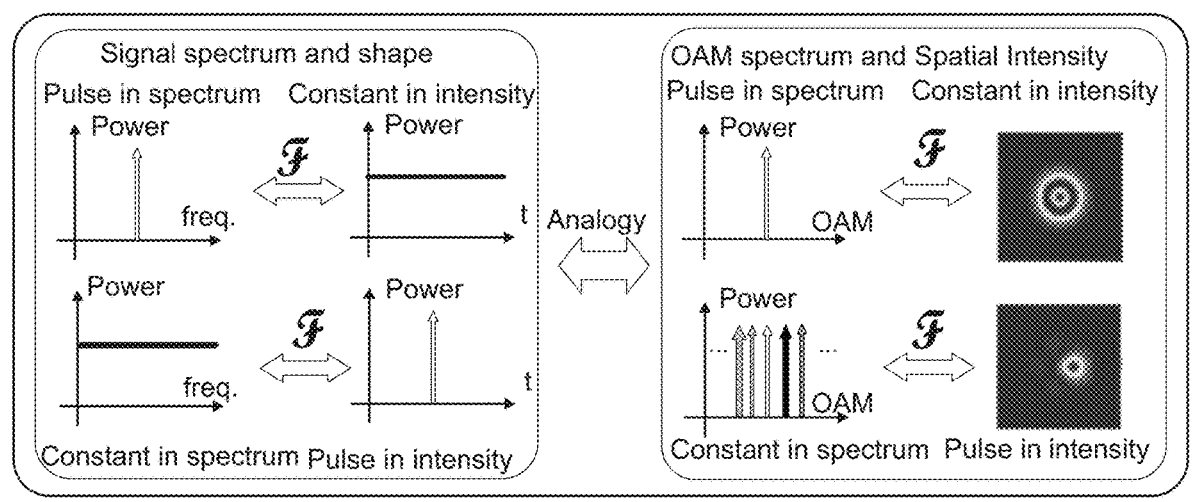
FIGS. 3A and 3B.
Figure 3B:
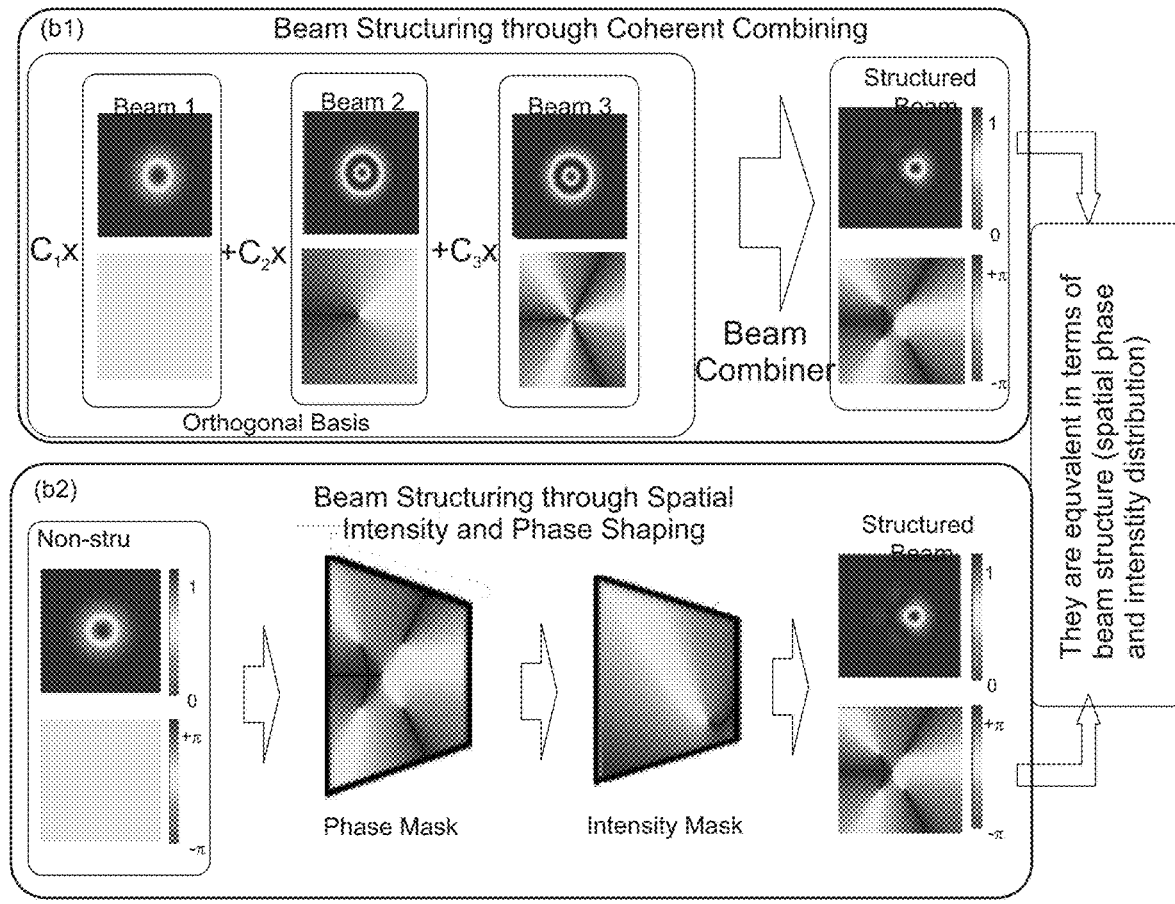

The experiments and simulations set forth below demonstrate the concept of spatial phase and amplitude structuring of beams using a combination of multiple complex-weighted orthogonal functions. As a Fourier-series-like example to produce a "delta" function, it is shown that beams can be created with profiles exhibiting much higher localized power density than simply adding multiple fundamental Gaussian beams. The beam structuring is simulated through combining [46, 47] multiple weighted OAM beams (FIG. 3B), thereby showing a localized power density enhancement of >10× by combining 19 beams. A proof-of-concept beam structuring is also demonstrated by tailoring a single beam [47, 48] (FIG. 3C), and a ~2.5× localized power density increase is achieved when utilizing 9 OAM functions.

Figure 4:
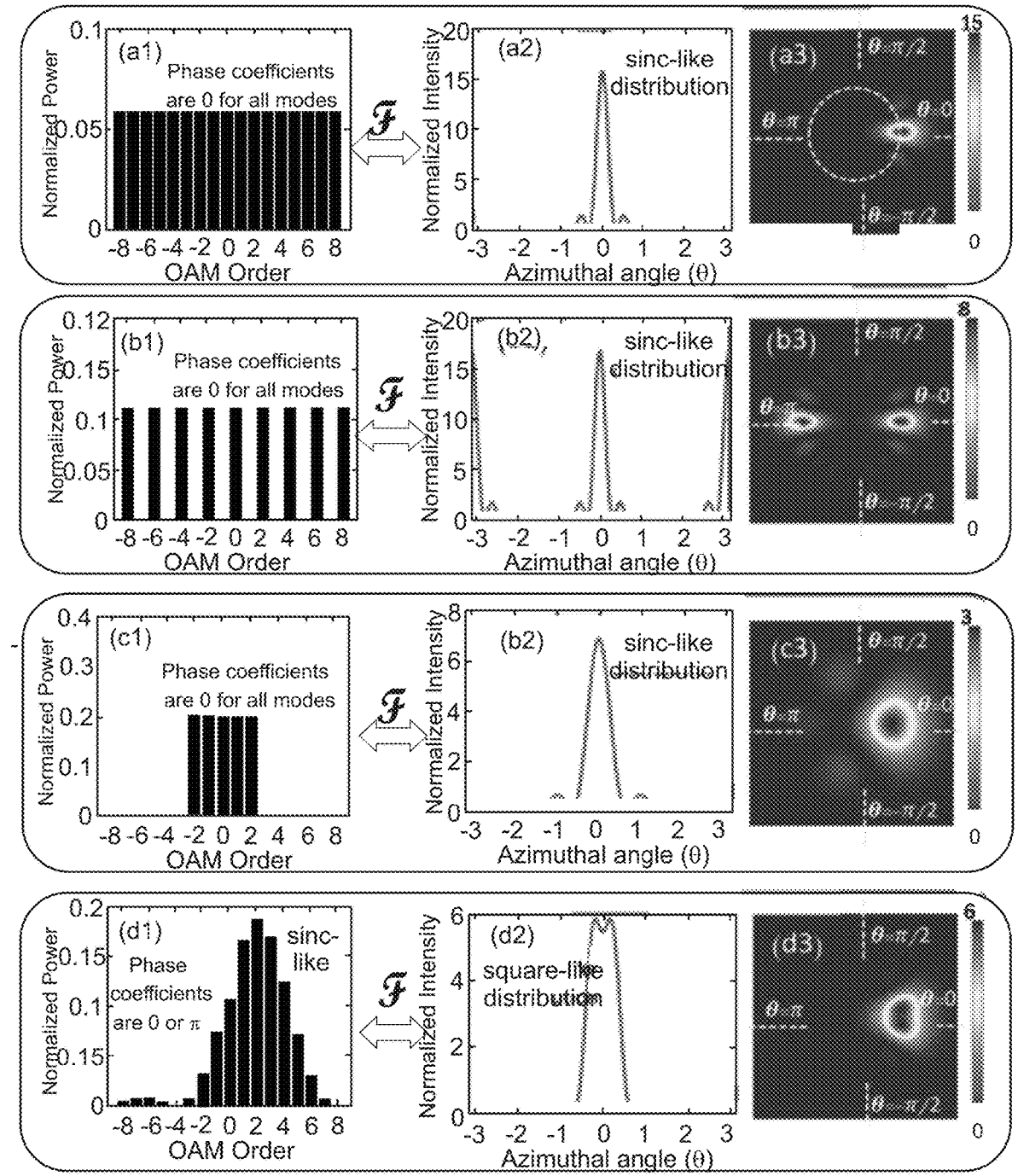
FIG. 4. Simulation results of Fourier relationship examples between the OAM spectrum and the intensity distribution of the structured beam in the azimuthal direction. (a1)-(d1) OAM spectrum; the temporal phase weights for all OAM modes in (a1)-(c1) are 0; the temporal phase weights in d1 are 0 for OAM−3 to +7 and $\pi$ for the other modes. (a2)-(d2) Normalized intensity along the azimuthal direction over the beam. (a3)-(d3) Intensity profiles of the structured beam.

The methods set forth herein are analogous to the concept of a Fourier series in cylindrical coordinates over the azimuthal direction, and each value of OAM represents a different phase change rate in the azimuthal direction [10-12], i.e., "spatial frequency." Simulations of the results show this Fourier-like time/frequency behavior [24] in the spatial domain: (1) when combining equal-weighted multiple OAM modes, the resultant beam's azimuthal intensity distribution is a sinc-like function [FIG. 4A]; (2) comparing FIG. 4B to FIG. 4A, when the spectrum uses every other mode (i.e., sampled), the azimuthal intensity produces periodic replicas in the spatial domain; (3) comparing FIG. 4C to FIG. 4A, a sinc-like azimuthal intensity distribution broadens when using fewer modes; (4) a sinc-like weighted combination produces a square-like azimuthal intensity distribution [FIG. 4D].

Figure 5:
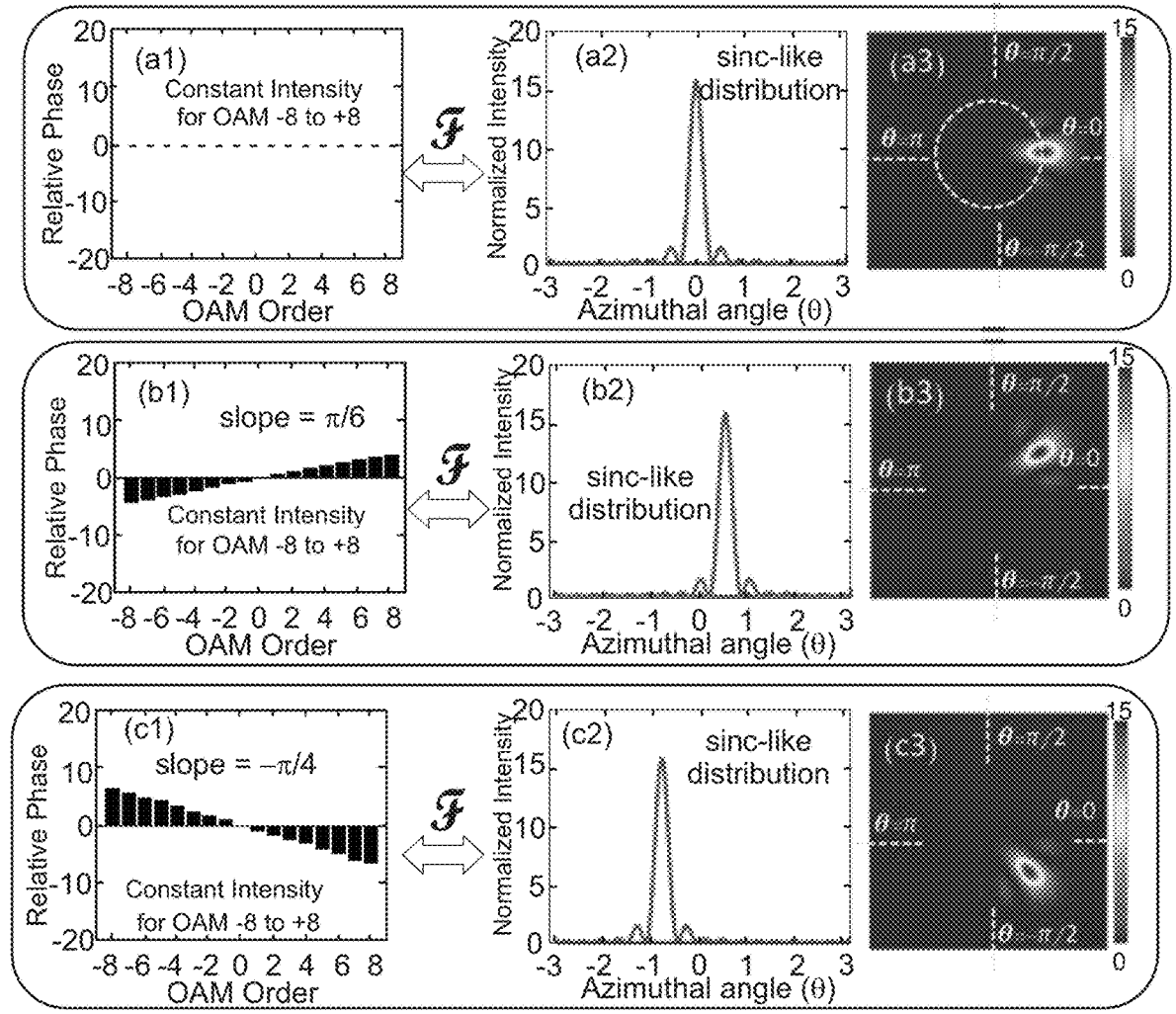
FIG. 5. Simulation results of controlling the position of the "hot spot." (a1)-(c1) Relative phase among OAM−8 to OAM+8 where all the beams have the same power. (a2)-(c2) Normalized intensity along the azimuthal direction over the beam. (a3)-(c3) Intensity profiles of the structured beam.

The OAM spectrum-based beam structuring can vary both the spot shape and the spot position of the generated beam. As shown in FIG. 5, the cases when OAM−8 to OAM+8 are combined with the same power, but a different/same relative temporal phase. If different beams have a relative temporal phase delay proportional to its OAM order, the resultant structured beams have the same spot shape. As shown in FIGS. 5A-C, the slope of the relative temporal phase delay is the angle of the spot rotated in the azimuthal direction. A positive slope gives counter-clockwise rotation, while a negative slope gives clockwise rotation.

Figure 6:
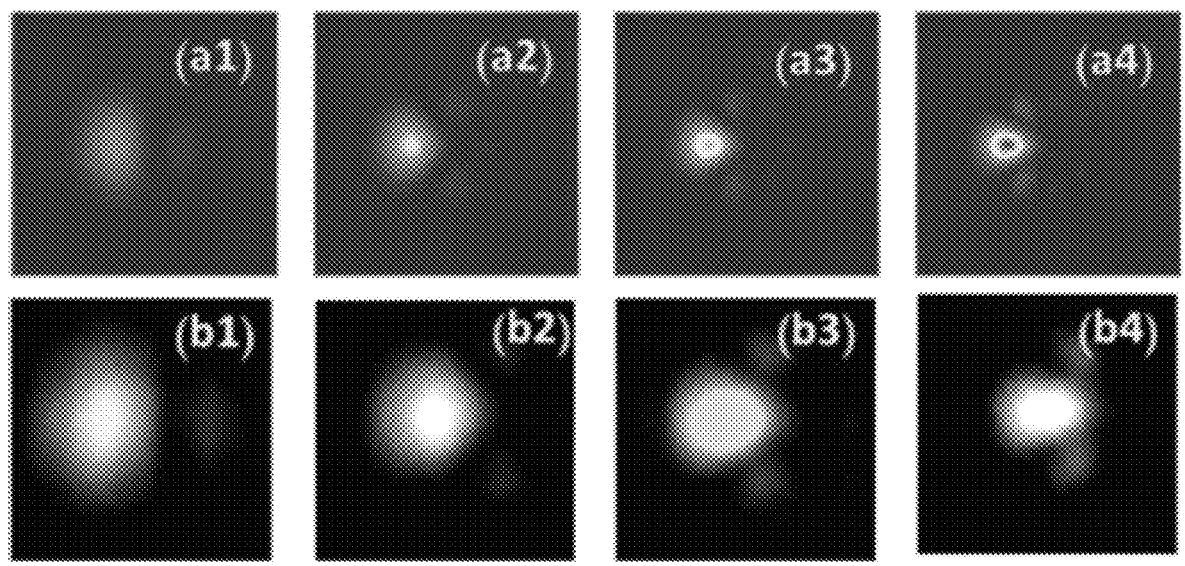
FIG. 6. Intensity profiles of the structured beams. (a1)-(a4) Simulated combining of OAM−L to +L beams with L=1; 2; 3; 4, respectively. (b1)-(b4) Experimental combining of OAM−L to +L beams with L=1; 2; 3; 4, respectively. All OAM beams have the same complex weight and beam size.

FIG. 6 shows the simulated and experimental results of the resultant intensity profile when different OAM beams are combined with equal weights. In the proof-of-concept experiment, instead of combining multiple beams as in the simulation, a spatial light modulator loaded with a pattern, which consists of the combination of multiple OAM functions, is used to control the phase and the intensity of a single incoming beam for beam shaping. Increasing the number of beams from 3 [e.g., FIGS. 6(a1) and 6(b1), OAM−1 to OAM+1] to 9 [e.g., FIGS. 6(a4) and 6(b4), OAM−4 to OAM+4], the intensity distribution of the beams is narrowed down.

Figure 7A:
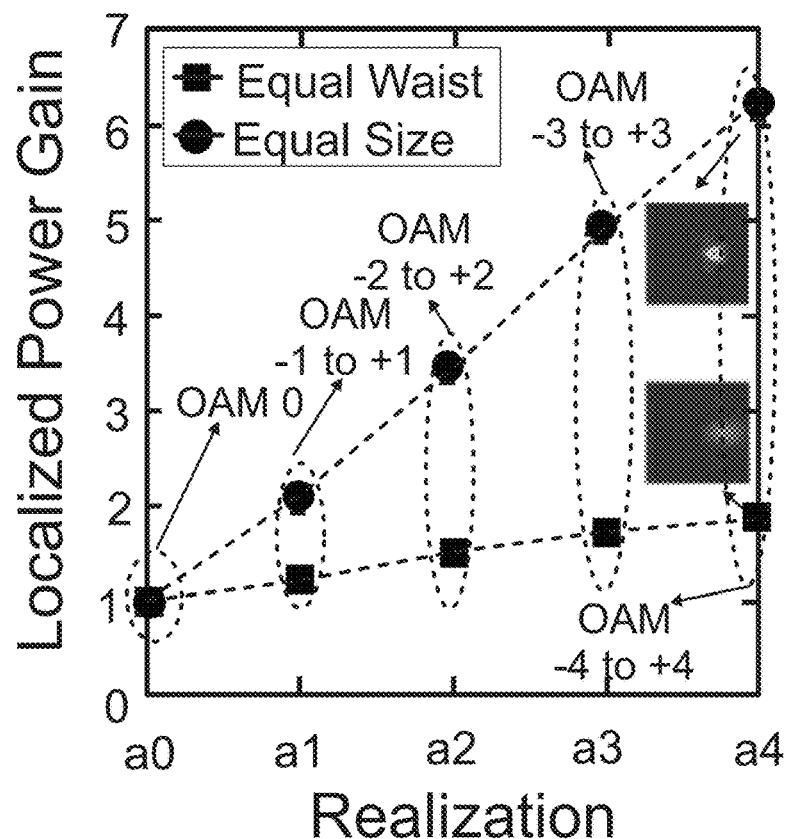
FIGS. 7A and 7B. Simulated localized power density gain achieved by beam structuring. (A) Combination of OAM−1 to +1 beams. (B) Combination of OAM 0 to +1 beams. Emitting aperture size, 6 cm; transmission distance, 100 m. The inset figures show the intensity profiles of the combined beams.
Figure 7B:
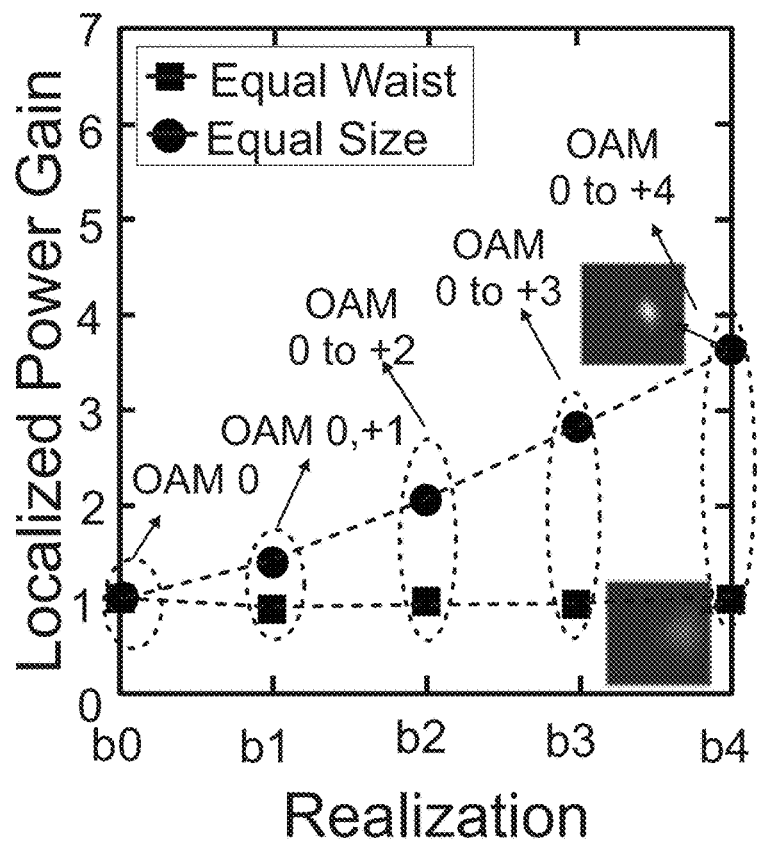

To evaluate this approach, simulation results for one of the most basic Fourier applications are shown. Similar to producing a "delta" function in the time domain out of multiple orthogonal frequency functions, we create spatial regions of high localized power density by adding multiple orthogonal OAM functions. The results for coherently combining multiple OAM beams are shown, each having a different OAM order and a potentially different complex weight. To analyze the localized power improvement, the localized power density gain (LPDG) which is defined as the ratio of the peak power density achieved by the approach set forth herein over that achieved by coherent combining of fundamental Gaussian beams [25-27] is used. It is noted that the beam combining effect is considered for LPDG comparison, regardless of the beam forming (focusing) effect. Two different beam-combining scenarios are investigated: (1) all OAM beams have equal waists, and the sizes (i.e., areas) are proportional to $\sqrt{\ell+1}$ [28]; and (2) all OAM beams have equal sizes, but different waists [29]. FIG. 7A shows the achieved LPDG using OAM orders−1 to +1 under both scenarios. The emitting aperture diameter is 6 cm and the transmission distance is 100 m. The equal size scheme shows a higher LPDG than the equal waist scheme due to more spatial overlapping. When nine OAM beams (OAM−4 to OAM+4) are equal size combined, a >6 LPDG is achieved. FIG. 7B exhibits a lower LPDG when only 0 to +1 are used.

Figure 8A:
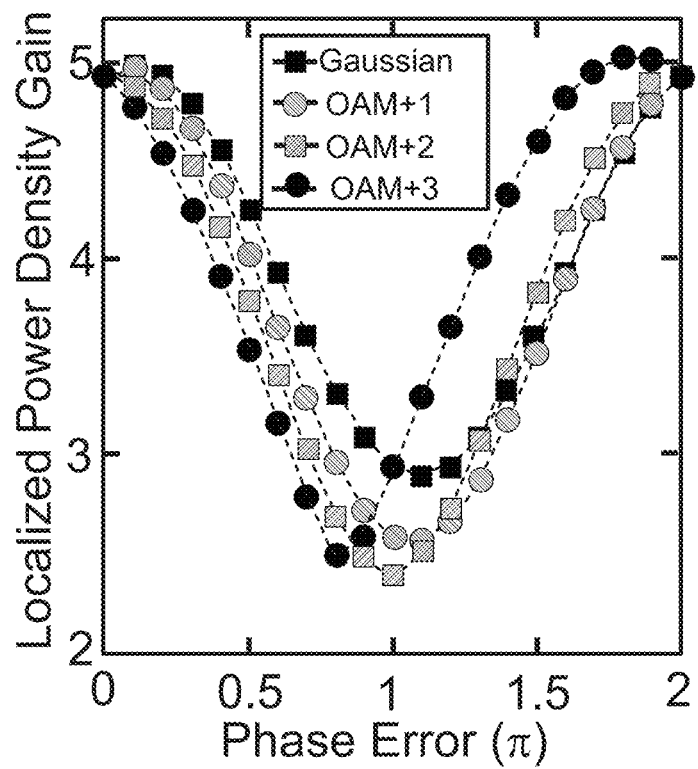
FIGS. 8A, 8B and 8C. Simulated Localized Power Density Gain (LPDG) Performance Under Different Scenarios. (A) LPDG degradation due to the time/phase misalignment of one of the modes when OAM−3 to +3 are combined. (B) LPDG degradation due to the power fluctuation of one of the modes when OAM−3 to +3 are combined. (C) LPDG as a function of the maximum OAM orders (L) for beam structuring at various distances. "Maximum OAM Orders L" denotes that OAM−L to +L are used for beam combining. For a fair comparison, the total power for all tests is the same.
Figure 8B:
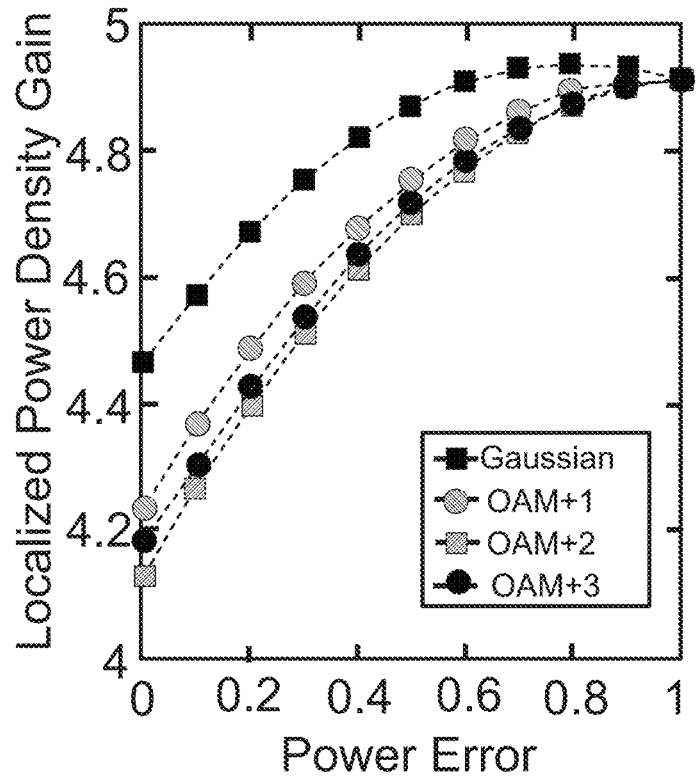
Figure 8C:
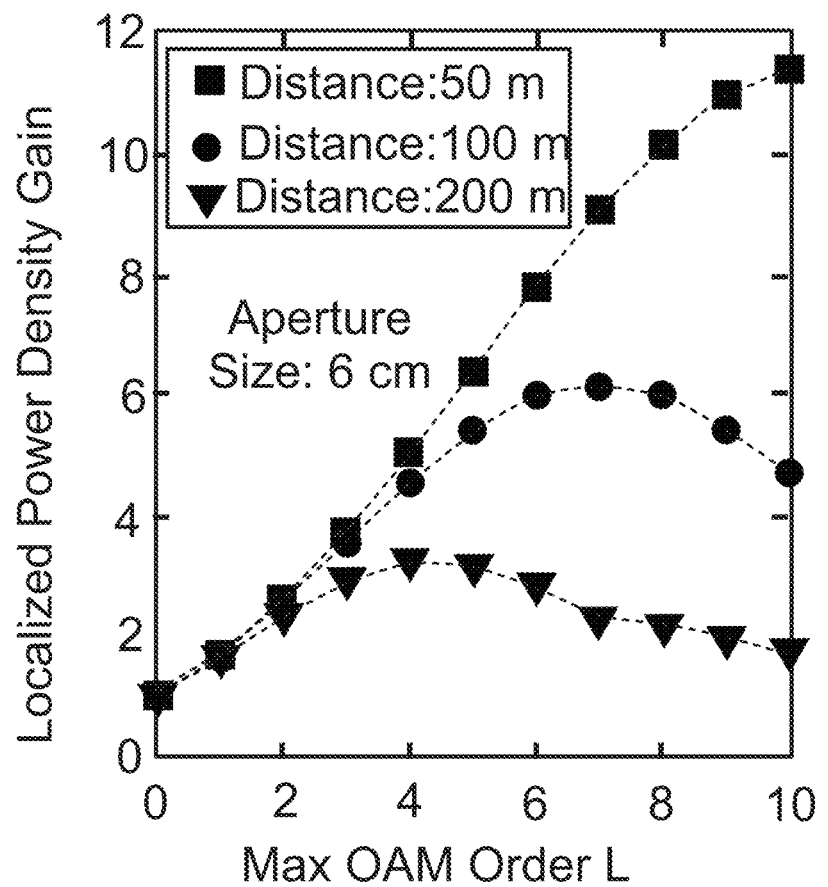

Although the above simulations assume that all beams are aligned in time and, therefore, have the same phase coefficient $\varphi_i$, time misalignment errors may occur in practice. FIG. 8A combines OAM beams with the order from −3 to +3 such that one beam suffers a time/phase misalignment relative to the other beams. The results show that a larger misalignment causes greater LPDG degradation, and a phase error of ~π degrades the LPDG from 5 to 2.5. Moreover, a real system may have errors in the desired amplitude coefficients $\alpha_i$ (i.e., power fluctuation) of the beams. FIG. 8B combines OAM−3 to +3, such that one beam suffers a power degradation relative to the other beams. The results show that if one of the beams has zero power, the LPDG degrades from 5 to 4.2. Since an OAM beam diverges faster as l increases, the sensitivity of LPDG to OAM divergence is investigated in FIG. 8C for various distances. Note that "Max OAM Order L" denotes that all OAM modes −L to +L are used. FIG. 8C shows that: (i) the LPDG decreases with distance; and (ii) when L is large enough, further increasing L leads to a decrease in the LPDG. This is because larger OAM beams diverge faster, and longer distance propagation causes less overlapping between the higher-order and lower-order OAM beams. For a 50-m distance, a >10×LPDG can be achieved when 19 OAM modes are combined.

Figure 9:
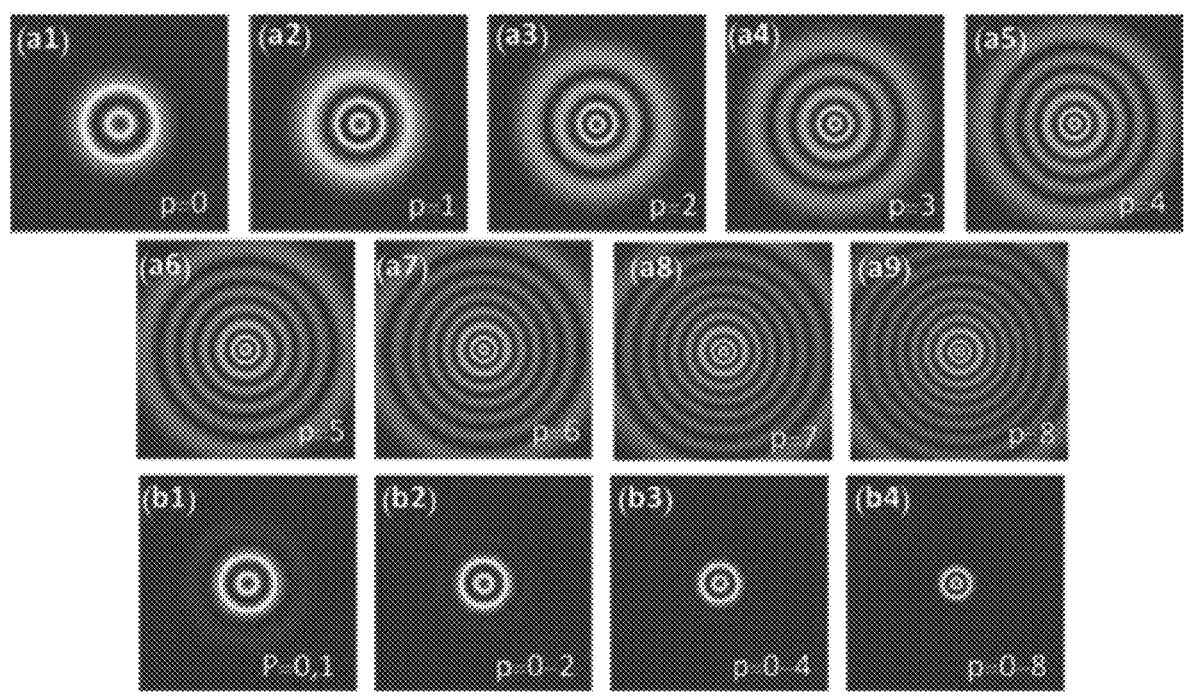
FIG. 9. (a1)-(a9) OAM+1 beams with different radial indices (p-value) for p=0; 1; 2; . . . , and 8. The simulated combination of OAM+1 beams with (b1) p=0 and p=1, (b2) p=0 to p=2, (b3) p=0 to p=4, and (b4) p=0 to p=8. For a fair comparison, the total power for all tests is the same.

In the analysis above, OAM modes are used with no radial change (p=0), and they form a one-dimensional complete basis over the azimuthal direction. Therefore, tunable beam structuring can be readily achieved in the azimuthal direction, but not in the radial direction. A two-dimensional complete basis, such as OAM modes with p≠0, which considers both radial change and azimuthal change [30], may potentially provide an arbitrary and tunable beam structuring over a two-dimensional plane. We note that to generate an OAM beam with a higher radial index, both the phase and intensity of the beam need to be shaped, which could be achieved by a spatial light modulator with a specially designed pattern [31]. As shown in FIG. 9, when OAM+1 beams with different radial indices are considered for beam combining, the resultant beam's intensity distribution in the radial direction could be potentially controlled. More radial modes allow the smaller spot in the radial direction.

The following points are worth mentioning. First, the combination of zero-radial-index OAM beams may create a beam shape with a dark hole in the center. This is because these beams form only one degree of freedom, i.e., the azimuthal, in the spatial domain. Second, more OAM modes theoretically could create a smaller spot size. However, the number of available modes may be limited in a practical application.

Figure 10A:
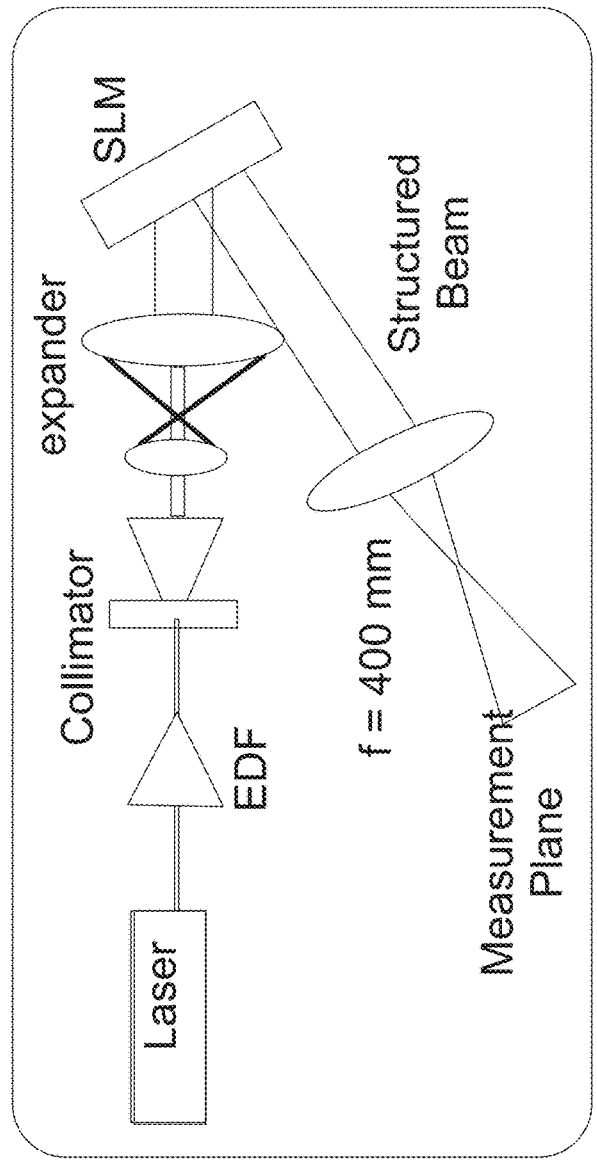
FIGS. 10A, 10B, 10C, and 10D. Experimental Beam Structuring for Achieving Localized Power Density Gain (LPDG). (A) Experimental setup. EDFA: Erbium-doped fibre amplifier; SLM: spatial light modulator. (B:b1-b5) Experimental intensity profiles of the structured beam using superposition function of: OAM 0, OAM−1 to +1, OAM−2 to +2, OAM−3 to +3, and OAM−4 to +4, respectively. Comparison between the experimental (C) and simulated (D) LPDG achieved through beam structuring. Emitting aperture size: 6 mm; transmission distance: 2.5 m.
Figure 10B:
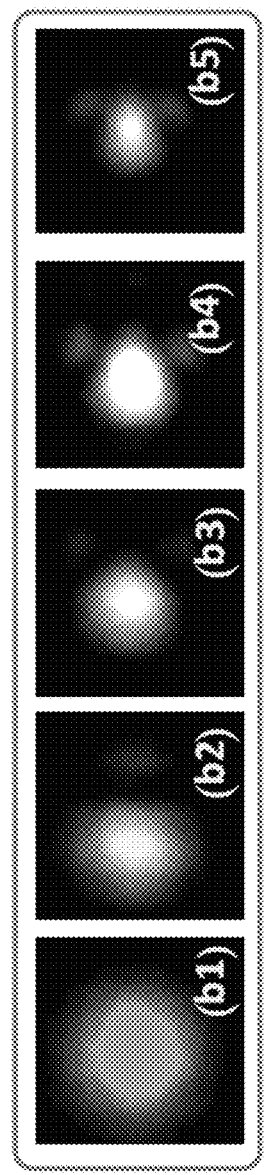
Figure 10C:
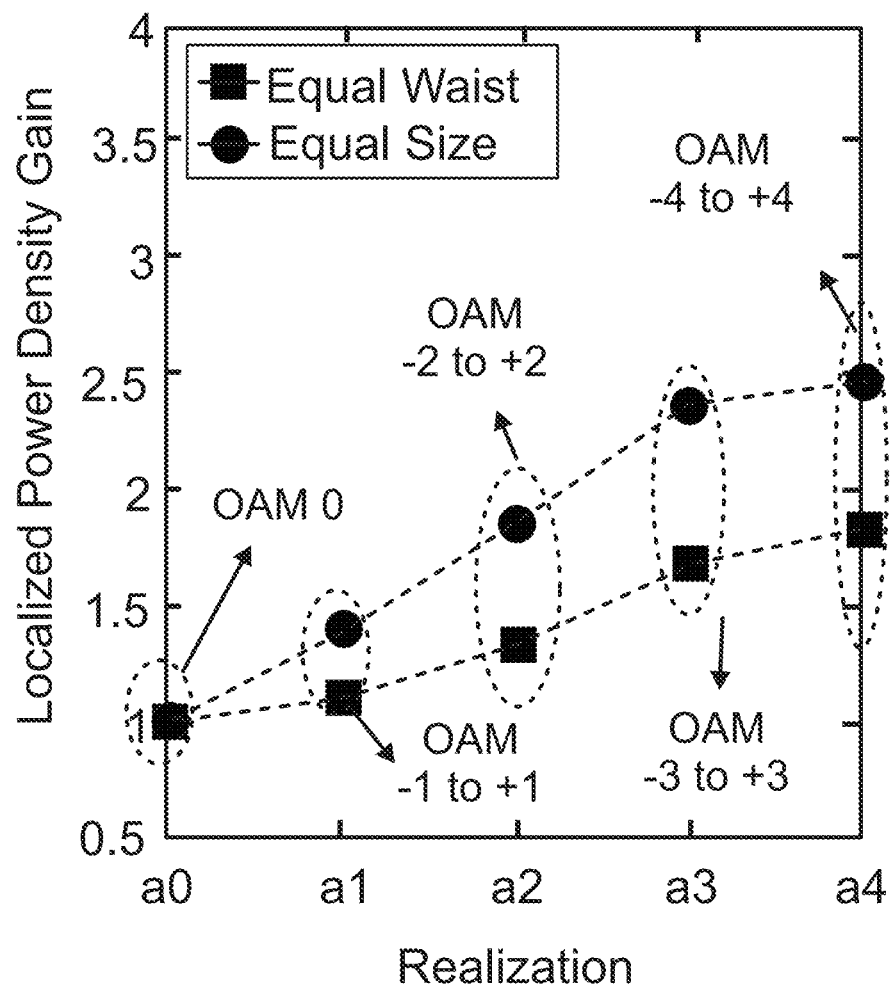
Figure 10D:
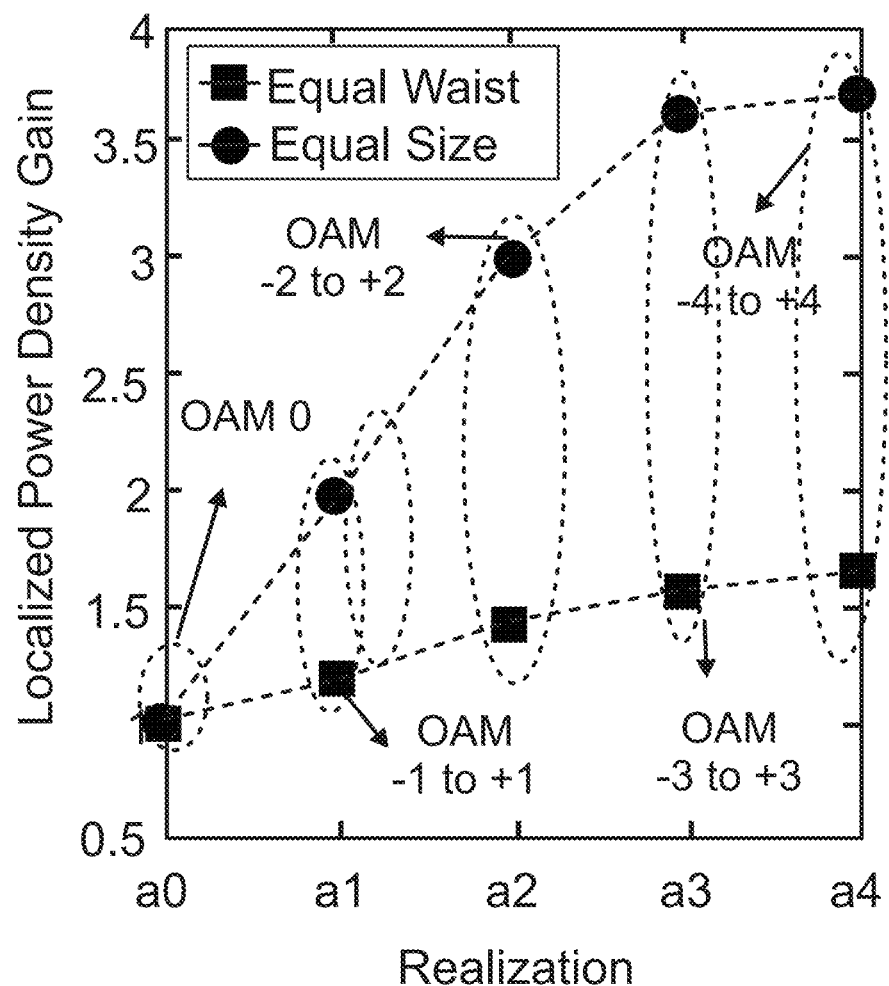

Another experiment is designed to demonstrate structuring of a single beam by combining multiple orthogonal functions, instead of combining multiple beams as was simulated above. In this experiment, an SLM is used to control the phase and the intensity of the incoming beam for beam shaping [48, 59] (FIG. 10A) although the SLM produces power loss when imposing the functions. The emitting aperture size is 6 mm and the transmission distance is 2.5 m. FIG. 10B shows the measured intensity profiles after SLM-based beam shaping, and FIGS. 10C and 10D show the achieved experimental and simulated LPDG, respectively. The figures show similar trends, yet an LPDG of 2.5 and 3.5 is achieved by the experiment and simulation, respectively. We believe that such a difference may be caused by the SLM's limited resolution and imperfect beam purity.

Beam Structuring Through Coherent Combining Different OAM Beams:

Previous reports have shown that, with a 'lossless' OAM mode combiner, OAM superimposing could be achieved by passing several beams at different positions through a free-space coordinate transfer system [40], thus offering the convenience of the proposed beam structuring.

Beam Structuring Through Phase/Intensity Shaping of One Beam:

For the proof of concept demonstration, FIG. 10 shows a structured beam being formed by passing a regular Gaussian beam through a specially designed phase mask which can control both the intensity and the phase of the incoming beam. The specially designed phase mask is composed by three parts which can be represented by [59]:

$$\Phi(x,y)_{holo} = ((\Phi(x,y)_{phase} + \Phi(x)_{grating})_{mod\ 2\pi} - \pi) \text{sinc}^2 (1 - I(x,y)) + \pi$$

where $\Phi(x,y)_{holo}$ is the hologram loaded on the spatial light modulator (SLM); $\Phi(x,y)_{phase}$ is the designed phase mask; $\Phi(x)_{grating}$ is blazed diffraction grating in x direction; and I(x,y) is the designed normalized intensity mask. After the incoming beam is reflected by the SLM, a pinhole follows to filter out the first-order diffraction of the modulated beam, which is the desired structured beam. Usually, the efficiency of the SLM is not 100%; Therefore, the blade grating helps to get rid of the unmodulated portion of the incoming beam, which stays on zero$^{th}$ order.

Additional details of the embodiments set forth above are found in G. Xie et al., *Spatial light structuring using a combination of multiple orthogonal orbital angular momentum beams with complex coefficients*, Optics Letters Vol. 42, Issue 5, pp. 991-994 (2017) (doi.org/10.1364/OL.42.000991) and G. Xie et al., *Spatial Phase and Amplitude Structuring of Beams Using a Combination of Multiple Orthogonal Spatial Functions with Complex Coefficients*, arXiv:1605.08842 [physics.optics]; the entire disclosures of these papers is hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. D. L. Andrews, *Structured Light and Its Applications: An Introduction to Phase-Structured Beams and Nanoscale Optical Forces* (Academic, 2011).
2. G. Molina-Teniza, J. P. Tones, and L. Tomer, Nat. Phys. 3, 305 (2007).
3. F. M. Dickey, *Laser Beam Shaping: Theory and Techniques* (CRC Press, 2014).
4. A. Forbes, A. Dudley, and M. McLaren, Adv. Opt. Photon. 8, 200 (2016).
5. L. Allen, M. W. Beijersbergen, R. J. C. Spreeuw, and J. P. Woerdman, Phys. Rev. A 45, 8185 (1992).
6. S. Saghafi, C. J. R. Sheppard, and J. A. Piper, Opt. Commun. 191, 173 (2001).
7. A. M. Yao and M. J. Padgett, Adv. Opt. Photon. 3, 161 (2011).
8. J. Wang, J.-Y. Yang, I. M. Fazal, N. Ahmed, Y. Yan, H. Huang, Y. Ren, Y. Yue, S. Dolinar, M. Tur, and A. E. Willner, Nat. Photonics 6, 488 (2012).
9. A. E. Willner, H. Huang, Y. Yan, Y. Ren, N. Ahmed, G. Xie, C. Bao, L. Li, Y. Cao, Z. Zhao, J. Wang, M. P. J. Lavery, M. Tur, S. Ramachandran, A. F. Molisch, N. Ashrafi, and S. Ashrafi, Adv. Opt. Photon. 7, 66 (2015).
10. G. Xie, C. Liu, L. Li, Y. Ren, Z. Zhao, Y. Yan, N. Ahmed, Z. Wang, A. J. Willner, C. Bao, Y. Cao, M. Tur, and A. E. Willner, in *Conference on Lasers and Electro-Optics (CLEO)* (Optical Society of America, 2016).
11. E. Yao, S. Franke-Arnold, J. Courtial, S. Barnett, and M. Padgett, Opt. Express 14, 9071 (2006).
12. A. K. Jha, B. Jack, E. Yao, J. Leach, R. W. Boyd, G. S. Buller, S. M. Barnett, S. Franke-Arnold, and M. J. Padgett, Phys. Rev. A 78, 043810 (2008).
13. B. Jack, M. J. Padgett, and S. Franke-Arnold, New J. Phys. 10, 103013 (2008).
14. O. V. Olesen, R. R. Paulsen, L. Højgaard, B. Roed, and R. Larsen, IEEE Trans. Med. Imaging 31, 79 (2012).
15. M. J. Tsai and C. C. Hung, Measurement 38, 236 (2005).
16. J. Geng, Adv. Opt. Photon. 3, 128 (2011).
17. M. W. Beijersbergen, L. Allen, H. E. L. O. Van der Veen, and J. P. Woerdman, Opt. Commun. 96, 123 (1993).
18. B. Lu and H. Ma, Appl. Opt. 39, 1279 (2000).
19. B. Jack, A. M. Yao, J. Leach, J. Romero, S. Franke-Arnold, D. G. Ireland, and M. J. Padgett, Phys. Rev. A 81, 043844 (2010).
20. J. P. Torres, Y. Deyanova, L. Torner, and G. Molina-Terriza, Phys. Rev. A 67, 052313 (2003).
21. E. Nagali, L. Sansoni, F. Sciarrino, F. De Martini, L. Marrucci, B. Piccirillo, and E. Santamato, Nat. Photonics 3, 720 (2009).
22. M. Krenn, J. Handsteiner, M. Fink, R. Fickler, R. Ursin, M. Malik, and A. Zeilinger, Proc. Natl. Acad. Sci. USA 113, 13648 (2016).
23. G. Kirchhoff, Ann. Phys. 254, 663 (1883).
24. R. Bracewell, *The Fourier Transform and Its Applications* (McGraw-Hill, 1965).
25. Y. Y. Fan, IEEE J. Sel. Top. Quantum Electron. 11, 567 (2005).
26. A. Brignon, *Coherent Laser Beam Combining* (Wiley-VCH, 2013).
27. D. Sabourdy, V. Kermène, A. Desfarges-Berthelemot, L. Lefort, A. Barthelemy, P. Even, and D. Pureur, Opt. Express 11, 87 (2003).
28. R. L. Phillips and L. C. Andrews, Appl. Opt. 22, 643 (1983).
29. M. Bor and E. Wolf, *Principles of Optics: Electromagnetic Theory of Propagation, Interference and Diffraction of Light* (CUP Archive, 2000).
30. A. Trichili, C. Rosales-Guzmán, A. Dudley, B. Ndagano, S. A. Ben, M. Zghal, and A. Forbes, Sci. Rep. 6, 27674 (2016).
31. J. Leach, M. R. Dennis, J. Courtial, and M. J. Padgett, New J. Phys. 7, 55 (2005).

What is claimed is:

1. A system for structuring a directed energy beam, the system comprising:
   one or more coherent light sources that emit a plurality of incident light beams;
   one or more spatial light modulators that modulate the plurality of incident light beams to form a plurality of orbital angular momentum beams, each spatial light modulator loaded with a pattern that receives an incident light beam and outputs an orbital angular momentum (OAM) beam, the pattern encoding one or more orthogonal orbital angular momentum functions; and
   a beam combiner that performs a coherent addition of orbital angular momentum beams to create a reconfigurable spatial region of localized power that forms the directed energy beam, each orbital angular momentum beam having an associated complex weight with which each orbital angular momentum beam is weighted in forming the coherent addition.

2. The system of claim 1 wherein the one or more coherent light sources are lasers.

3. The system of claim 1, wherein each of the orbital angular momentum beams are components of an orthogonal basis set.

4. The system of claim 1, further comprising an optical switch that selects a subset of the plurality of orbital angular momentum beams from the plurality of orbital angular momentum beams for which the coherent addition is performed.

5. The system of claim 1, wherein each of the plurality of orbital angular momentum beams has a different orbital angular momentum order and has a different complex weight.

6. The system of claim 1, wherein all beams of the plurality of orbital angular momentum beams have equal waists.

7. The system of claim 6 wherein each beam of the plurality of has a size proportional to $\sqrt{l+1}$ where l is an azimuthal index.

8. The system of claim 1, wherein each beam of the plurality of orbital angular momentum beams has a radial index (p) that is equal to 0.

9. The system of claim 1, wherein each beam of the plurality of orbital angular momentum beams has a radial index (p) that is not equal to 0.

10. The system of claim 1, wherein the plurality of orbital angular momentum beams includes 2l orbital angular momentum beams having orders −l to +l wherein l is an integer representing an azimuthal index.

11. The system of claim 1, wherein the one or more spatial light modulators control power level and phase of each beam of the plurality of orbital angular momentum beams to be equal to a power level and phase of the other beams of the plurality of orbital angular momentum beams.

12. The system of claim 1, wherein the one or more spatial light modulators control power level and phase of each beam of the plurality of orbital angular momentum beams based on an orbital angular momentum superposition.

13. The system of claim 1, wherein the one or more spatial light modulators are loaded with a pattern that includes a combination of a plurality of orbital angular momentum functions that control the power level and phase of each beam of the plurality of orbital angular momentum beams.

14. The system of claim 1 wherein the one or more coherent light sources includes a laser configured to generate a single beam, the one or more spatial light modulators (SLMs) configured to divide the single beam into a plurality of beams; control a power level of each beam of the plurality of beams; and control a phase of each beam of the plurality of beams.

* * * * *

UNITED STATES PATENT AND TRADEMARK OFFICE
CERTIFICATE OF CORRECTION

PATENT NO. : 10,914,959 B2  
APPLICATION NO. : 15/990608  
DATED : February 9, 2021  
INVENTOR(S) : Long Li et al.

Page 1 of 1

It is certified that error appears in the above-identified patent and that said Letters Patent is hereby corrected as shown below:

In the Specification

Column 1, Line 14:
Before the heading "Technical Field" - insert:
--STATEMENT REGARDING FEDERALLY SPONSORED RESEARCH OR DEVELOPMENT
The invention was made with Government support under Contract No. ECCS-1509965 awarded by the National Science Foundation (NFS) and Contract No. N00014-16-1-2813 awarded by the Office of Naval Research (ONR). The Government has certain rights to the invention.--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*